J. STEPHENSON.

STREET-CAR.

No. 6,987. Reissued March 7, 1876.

Witnesses:

D. G. Stuart

James H. McGill

Inventor:

John Stephenson by P. Hannay

Atty.

UNITED STATES PATENT OFFICE.

JOHN STEPHENSON, OF NEW YORK, N. Y.

IMPROVEMENT IN STREET-CARS.

Specification forming part of Letters Patent No. 61,482, dated January 22, 1867; reissue No. 6,696, dated October 11, 1875; reissue No. 6,987, dated March 7, 1876; application filed December 17, 1875.

DIVISION E[5].

*To all whom it may concern:*

Be it known that I, JOHN STEPHENSON, of New York, in the county of New York and State of New York, have invented certain new and useful Improvements in Street-Cars; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
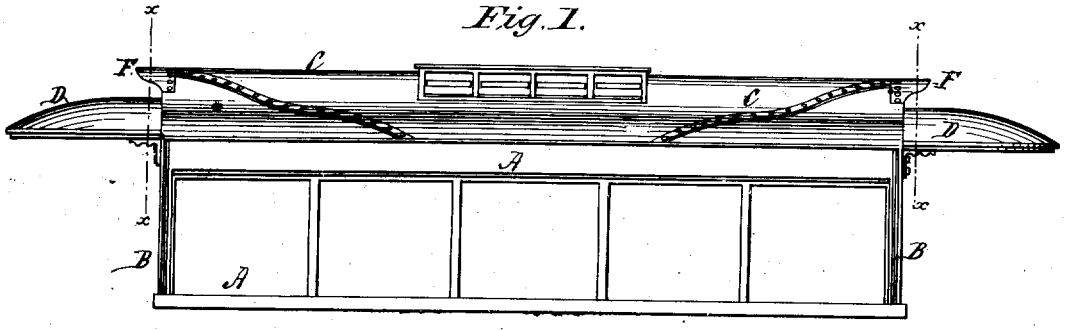
Figure 2:
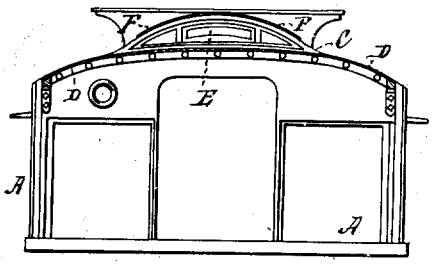
Figure 3:
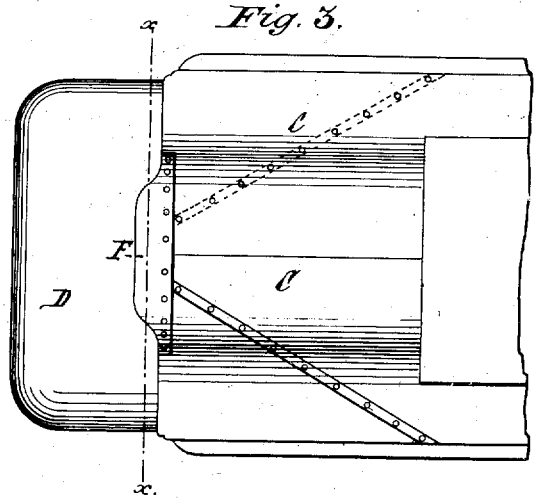

Figure 1 represents a side elevation of the upper portion of the body of a street-car to which my improvement has been applied, and Fig. 2 a cross-section of the same looking toward the body of the car. Fig. 3 represents a plan or top view of a portion of the same car, showing the relation of the roof-extension to the end of the car.

This division of my invention relates solely to street-cars provided with roofs which terminate at the ends of the car-body, and which are otherwise provided with openings in their ends for the purposes of illumination, ventilation, and signal, and which openings are arranged between the ridge of the roof and the canopy for the protection of the driver's or conductor's platform. Cars so constructed expose the passengers through these openings to the rays of the sun, as well as to the incoming rain and snow.

My improvement provides a remedy for these evils; and it consists in so constructing the roof of the car that its end or ends at the sides shall be coterminous with the ends of the car, and so that its end or ends at its central or arched portion shall be slightly projected beyond the end or ends of the car, in order that the projecting portion may form a shelter or protection for the opening or openings formed in the ends of the car for ventilating, illuminating, or signaling purposes, and which opening or openings are arranged in a plane intermediate between the central or ridge portion of the roof and the canopy which shelters the driver's platform. This projecting part of the central or arched portion of the roof is made of a length sidewise sufficient to cover or protect the entire length of the opening or openings, and is then diminished on each side by easy-curved lines, until the projection merges in the main roof; this diminishing line, however, is not a necessity, but, on the contrary, is simply used to give a more elegant or finished appearance to the extension.

To enable others skilled in the art to make, construct, and use my invention, I will now proceed to describe its parts in detail, omitting a particular description of such parts of a street-car as are unnecessary to a full understanding of the present improvement.

In the drawings, A indicates the body of the car, B the ends, and C a roof of the same general length as the body of the car. D indicates the canopy or canopies which protect the driver's or conductor's platform or platforms, and E the openings provided in the ends of the car for the purposes of illumination, ventilation, and signal. The openings E, (see Fig. 2,) it will be observed, are arranged in a plane intermediate between the upper side of the shelter-canopy D and the plane of the central or ridge part of the main roof. Now, if the main roof is limited to the length of the car-body, such construction would necessarily leave the openings E exposed to the action of the sun and to the inclemency of the weather, greatly to the annoyance of the passengers. To obviate this I construct the end or ends of the central or ridged portion of the roof so that it shall slightly project beyond the ends of the car, and extend for a distance laterally equal to or slightly exceeding the length of the opening or openings E, so as to form a shelter or frontlet, F, for the protection of the latter. This extension F of the roof beyond the ends of the car I usually make about eight inches, such projection, as a rule, furnishing the necessary protection; but that may be varied according to the judgment of the builder, and may be effected in any way known to mechanics for accomplishing such kind of work.

I find that a plate of metal, such as that shown at F in the drawings, answers an admirable purpose, as it is light, simple, inexpensive, and easy of attachment to the ends of the car, and which is effected either by tacking or screwing it to the roof.

Having described my invention, what I claim as new, and desire to secure by Letters Patent, is—

A roof, C, of a street-car, in which its end or ends at the sides are made coterminous with the ends of the car, and in which its end or ends at its middle or arched portion F are made to project slightly beyond the end or ends of the car, to form a shelter or protection for the opening or openings E, formed in the end or ends of the car, between the central or ridge portion of the roof and the canopy D, which shelters the driver's or conductor's platform, substantially as set forth.

In testimony that I claim the foregoing I have hereunto set my hand this 3d day of December, 1875.

JOHN STEPHENSON.

Witnesses:

S. A. STEPHENSON,

AUGUST RIPPERGER.